UNITED STATES PATENT OFFICE.

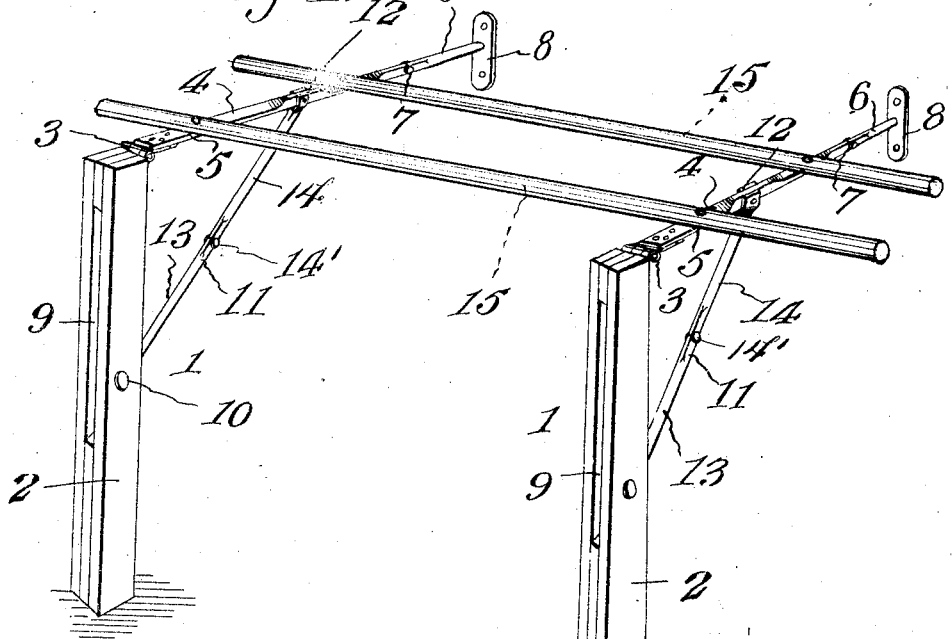
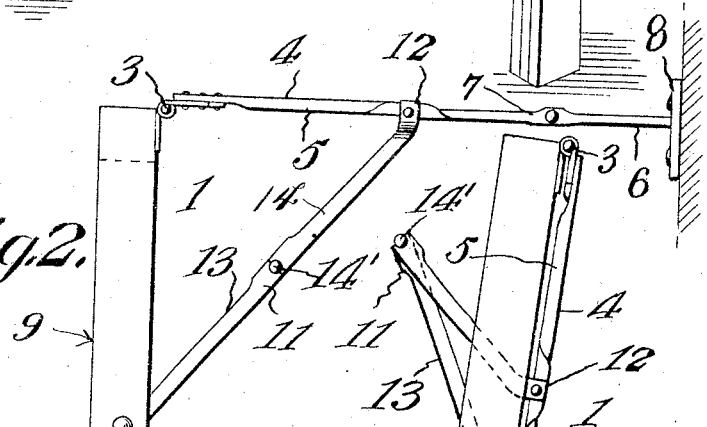
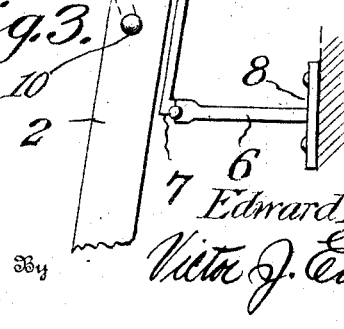

EDWARD A. SIGLER, OF COLEMAN, MICHIGAN.

FOLDING POULTRY-ROOST.

No. 901,843.　　　Specification of Letters Patent.　　　Patented Oct. 20, 1908.

Application filed February 25, 1908. Serial No. 417,670.

*To all whom it may concern:*

Be it known that I, EDWARD A. SIGLER, a citizen of the United States, residing at Coleman, in the county of Midland and State of Michigan, have invented new and useful Improvements in Folding Poultry-Roosts, of which the following is a specification.

This invention relates to improvements in poultry roosts or perches, the object of the invention being to provide a simple, inexpensive and convenient type of device of this character which may be folded parallel with the wall of the poultry house, so that it will be out of the way to permit the floor of the house to be readily cleaned.

The invention consists of the features of construction, combination and arrangement of parts hereinafter fully described and claimed, reference being had to the accompanying drawing, in which :—

Figure 1 is a perspective view of the device, the perch bars or slats being shown in dotted lines. Fig. 2 is a side elevation of one of the standards and parts carried thereby. Fig. 3 is a sectional elevation of the same in folded position.

In carrying my invention into practice, I provide a pair of spaced supports 1, each comprising a vertical post or standard 2, to the upper end of which is hinged or pivoted, as at 3, a perch bar or rod 4, said bar comprising two sections 5 and 6 connected by a rule or ordinary buggy top joint 7 to permit the outer or longer section 5 to swing in an upward direction. The shorter section 6 of said bar or rod is fixed to a bracket 8 which is designed to be secured to one of the side walls of the poultry house in any preferred manner. The post or standard 2 is formed with a vertical slot 9 extending completely therethrough from front to rear, and extending transversely across the slot is a pin or bolt 10 on which is pivotally mounted the lower end of a brace 11, pivotally connected at its upper end to the section 5 of the perch rod or bar 4, as at 12. The brace lies in an inclined position to prevent outward movement of the post or standard and downward movement of the perch rod or bar, and comprises two sections 13 and 14 of substantially equal length and connected at their meeting ends by a rule or buggy top joint 14', adapting said brace to break or fold in an upward and outward direction. The supporting devices as thus constructed are spaced a desired distance apart and in operative position the bars 4 thereof are horizontal, while the posts 2 are vertical and rest at their lower ends upon the floor of the house, relative movement of the bars and posts being prevented by the extended braces 11.

The device is completed by the use of a plurality of perch bars or slats 15 supported by the bars 4 and secured thereto in any preferred manner, such bars or slats 15 serving as the body or frame of the device upon which the fowls perch.

The normal position of the parts is shown in Figs. 1 and 2, from which the mode of use of the device will be apparent. When it is desired to fold the perch or roost out of the way so as to permit of the floor of the poultry house being cleaned without interference therefrom, the standards 2 are moved upwardly and inwardly and the bars 4 and braces 11 forced to break at their respective joints 7 and 14', so that the sections 5 of the bars 4 will swing upwardly and rearwardly beyond a vertical position close to the wall surface, while the sections 13 and 14 of each brace will converge and fold into and project through the slots 9 in the post, thus supporting the posts in an elevated position and suspending the device as a whole in close proximity to the wall and above the floor surface, as indicated in Fig. 3, thus permitting the floor to be readily cleaned.

To restore the roost to normal position, it is simply necessary to swing the posts downward until they again rest upon the floor and to then straighten out the braces 11, as will be readily understood.

Having thus fully described the invention, what is claimed as new is :—

1. A poultry roost comprising a pair of spaced supports, each comprising a standard, a supporting bar composed of jointed sections, one secured to the standard and the other adapted for fixed connection with a wall, and a folding brace connecting the first-named section of the standard to the post, and perch bars carried by the supporting bars, whereby the device as a whole is adapted to be folded in proximity to the wall to which said supporting bars are attached.

2. A poultry roost comprising a pair of spaced standards adapted to rest at their lower ends upon a floor surface, supporting bars pivoted at one end to the standards and provided at their opposite ends with means of connection to a wall, said bars being composed of jointed sections, perch bars carried by the supporting bars, and folding braces connecting said supporting bars with the standards.

3. A poultry roost comprising a pair of spaced standards having vertical slots, supporting bars pivoted at one end to the upper ends of the standards and provided at their opposite ends with brackets for attachment to a wall, said bars being composed of jointed sections, perch bars carried by the supporting bars, and folding braces connecting the bars with the posts, said braces being adapted to fold into the slots in the posts.

In testimony whereof I affix my signature in presence of two witnesses.

EDWARD A. SIGLER.

Witnesses:
CHAS. HALEY,
R. J. HYDE